United States Patent [19]

Loutit

[11] Patent Number: 4,473,470

[45] Date of Patent: Sep. 25, 1984

[54] FLUID STRAINER

[75] Inventor: John M. Loutit, Blackburn South, Australia

[73] Assignee: Boving & Co. (Anz.) Pty. Ltd., Melbourne, Australia

[21] Appl. No.: 387,452

[22] Filed: Jun. 11, 1982

[30] Foreign Application Priority Data

Jun. 17, 1981 [AU] Australia .............................. PE9329

[51] Int. Cl.$^3$ ............................................ B01D 35/02
[52] U.S. Cl. ................................ 210/409; 210/497.01; 210/497.3
[58] Field of Search ............... 210/446, 448, 409, 767, 210/407, 447, 451, 497.3, 499, 483, 497.01; 55/418, 462

[56] References Cited

U.S. PATENT DOCUMENTS

| | | | |
|---|---|---|---|
| 326,014 | 9/1885 | Bryant | 210/409 |
| 417,127 | 12/1889 | Williams | 210/448 |
| 1,249,724 | 12/1917 | Davis | 210/409 |
| 1,297,978 | 3/1919 | Teeling | 210/446 |
| 1,590,128 | 6/1926 | Staples | 210/409 |
| 2,582,401 | 1/1952 | Stinson | 210/409 |
| 2,998,064 | 8/1961 | Lang | 210/409 |
| 3,458,050 | 7/1969 | Cooper | 210/448 |
| 3,622,006 | 11/1971 | Brunner | 210/448 |
| 3,992,886 | 11/1976 | Scott | 210/446 |
| 4,033,872 | 7/1977 | Mori | 210/448 |
| 4,051,042 | 9/1977 | Tullier et al. | 210/447 |

Primary Examiner—Charles N. Hart
Assistant Examiner—Wanda L. Millard
Attorney, Agent, or Firm—Berman, Aisenberg & Platt

[57] ABSTRACT

A self-cleaning strainer for use in fluid distribution systems including an open ended tubular body having an inlet at one end and an outlet at the other. In use, the strainer body is placed with its axis extending in the direction of fluid flow and with the inlet upstream. The inlet is substantially larger than the outlet and the side wall of the body slopes inwardly away from the inlet so that the cross sectional size of the interior of the body progressively decreases towards the outlet. The side wall is composed at least in part of a plurality of laterally spaced and substantially parallel bars which extend generally in the axial direction of the body. The space between each two adjacent bars constitutes a fluid escape passage and the outlet of the body provides a discharge outlet for particles unable to pass through the passages. The fluid escape passages are elongate in the axial direction of the body and consequently fluid can pass through the side wall without substantial change in flow direction. The slope of the side wall directs trapped particles into the discharge outlet.

9 Claims, 14 Drawing Figures

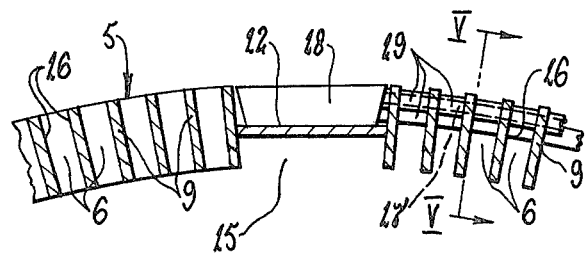
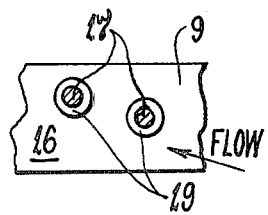
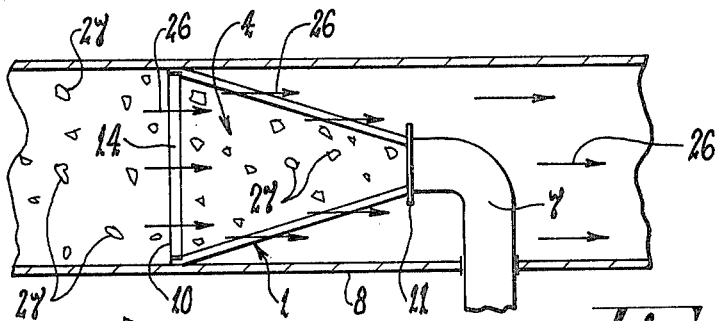
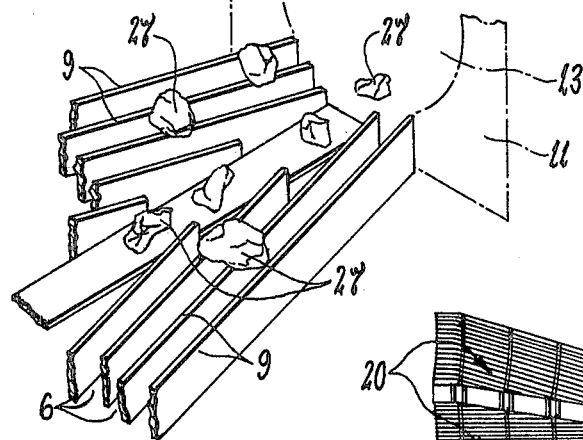
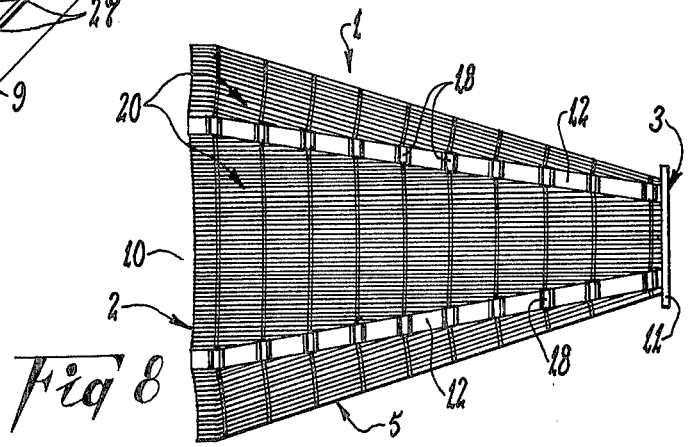

FLUID STRAINER

This invention relates to fluid strainers and is particularly concerned with such strainers as used in liquid transport conduits and channels. One particular application of such strainers is in the water-feed conduits for pumps, turbines, and similar equipment which requires substantial absence of foreign matter in the feed water.

Strainers of the aforementioned kind generally comprise a screen which is interposed in the liquid flow path and is of such a mesh size as to prevent passage of solid particles above a predetermined size. The particles therefore collect on the screen and progressively block it, so necessitating periodic cleaning of the screen. Cleaning of the screen can be effected in several ways.

1. The screen may be removed and then cleaned manually such as by hosing and/or scrubbing. An obvious disadvantage of this procedure is the need to interrupt the liquid flow until the screen has been replaced.
2. The liquid flow is reversed to backwash the screen while it is kept in place. Such backwashing may be over the entire screen or in a selected portion thereof so that the remaining portion can function normally without interruption. The liquid flow is either terminated or reduced according to which of the alternatives is used.
3. The liquid flow is modified to create a rotational flow which passes angularly across the screen surface to dislodge the collected particles and those particles are then removed through a scour outlet.

Each of the procedures described involves termination or modification to the liquid flow and that necessarily generates a loss of head or a pressure drop across the unit being fed by the liquid stream.

It is a principal object of the present invention to provide a strainer which is substantially self cleaning. It is a further object of the invention to provide a strainer which can be cleaned without requiring substantial modification of the liquid flow through it. Still another object of the invention is to provide an improved fluid transport system including such a strainer.

According to one aspect of the present invention, there is provided a fluid strainer including, a tubular body defining a separation chamber, an inlet opening at one end of said body communicating with said chamber, said chamber progressively reducing in cross sectional size in the direction away from said inlet opening, a side wall of said body surrounding said chamber over substantially the full length thereof, and a plurality of passages formed through said side wall whereby fluid can escape from said chamber to the exterior of said tubular body, said passages being provided over substantially the full length of said chamber.

According to a further aspect of the invention, there is provided a method of straining fluid including directing said fluid against a sloping separation wall having passages through which said fluid can pass from one side of said wall to the other without substantial change in flow direction, and arranging the slope of the upstream surface of said wall relative to said flow direction so that solid particles impinging against that surface are urged to move along the surface towards the downstream end thereof.

It is generally preferred to provide an outlet opening at the end of the strainer body remote from the inlet so that waste or other solid material can be discharged, such as by way of a pipe connected to that opening. It is further preferred that the fluid escape passages are defined between adjacent and substantially parallel bars which extend generally in the direction of the strainer body and a large part of the side wall may be composed of discrete groups of said bars. The bars are ideally in the form of slats of rectangular cross section arranged edge-on so that the fluid escape passages are formed between opposed flat broad surfaces of the bars. It is to be understood that the bars need not be exactly parallel, and they preferably diverge outwardly from the strainer axis to adapt to the changing cross sectional size of the tubular strainer body.

The cross sectional shape of the tubular body can be selected to suit particular requirements. If the strainer is to be used in a cylindrical conduit for example, it will generally be of circular cross section, at least at the inlet end. It may however, be of any suitable polygonal shape in cross section and in that regard, the word "polygonal" is to be read broadly as embracing multi-sided figures in which the sides are curved. Furthermore, the cross sectional shape may vary between the ends of the body.

The essential features of the invention, and further optional features, are described in detail in the following passages of the specification which refer to the accompanying drawings. The drawings however, are merely illustrative of how the invention might be put into effect, so that the specific form and arrangement of the features (whether they be essential or optional features) is not to be understood as limiting on the invention.

In the drawings:

FIG. 4 is a cross sectional view taken along line IV—IV of FIG. 3;

FIG. 5 is a cross sectional view taken along line V—V of FIG. 4;

FIG. 6 shows an example installation of the strainer shown in FIG. 1;

FIG. 7 is a perspective view of part of the outlet end portion of the strainer shown in FIG. 6;

FIG. 8 is a side elevational view looking in the direction of arrows VIII—VIII of FIG. 2;

Figure 1:
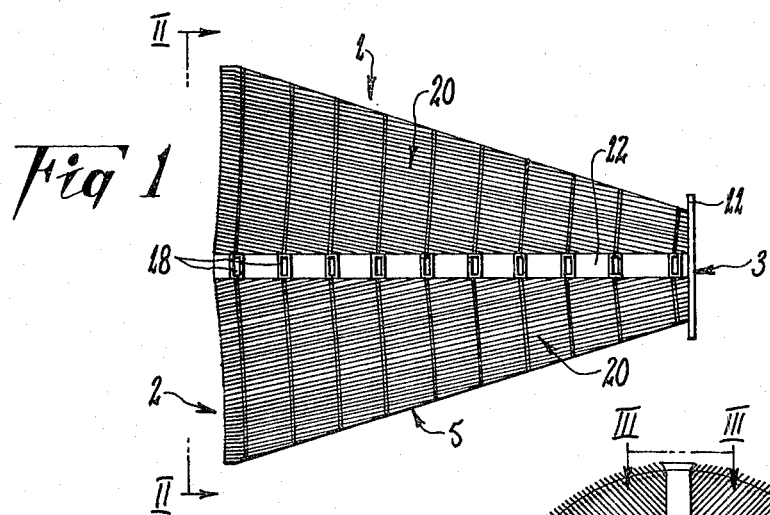
FIG. 1 is a side elevational view of one embodiment of the invention.

The particular strainer shown in the drawings has a hollow body 1 composed of four cylindrical segments each of which progressively reduces in width so that they may be arranged roughly in the form of a cone as shown. The body 1 however, may be a hollow pyramid, or it may be of any other shape which reduces in cross sectional size from an inlet end 2 towards an opposite end 3. The interior of the strainer body 1 forms a separation chamber 4 and that is surrounded by a perforate side wall 5 having passages 6 through which liquid can pass from the chamber 4 while solid particles of a predetermined size and greater are trapped within the chamber 4, or at least prevented from escaping through the side wall 5. The inlet end 2 of the strainer body 1 is preferably completely open and the opposite end 3 may be open or closed (wholly or partially) according to requirements.

In the preferred arrangement shown, the end 3 of the strainer is open and is connected to a discharge pipe 7 for waste or other solid particles. The pipe 7 is of much smaller size than the conduit 8 within which the strainer body 1 is located and extends out of that conduit 8 to a suitable disposal zone (see FIG. 6).

In the particular construction shown, the side wall 5 of the strainer body 1 is composed of a series of slats or bars 9 which extend generally in the longitudinal direction of the strainer body 1 and are laterally spaced a predetermined distance. That distance is predetermined according to the particular environment in which the strainer is to be used. It is preferred that the spacing is substantially constant over the length of the strainer body 1.

Figure 2:
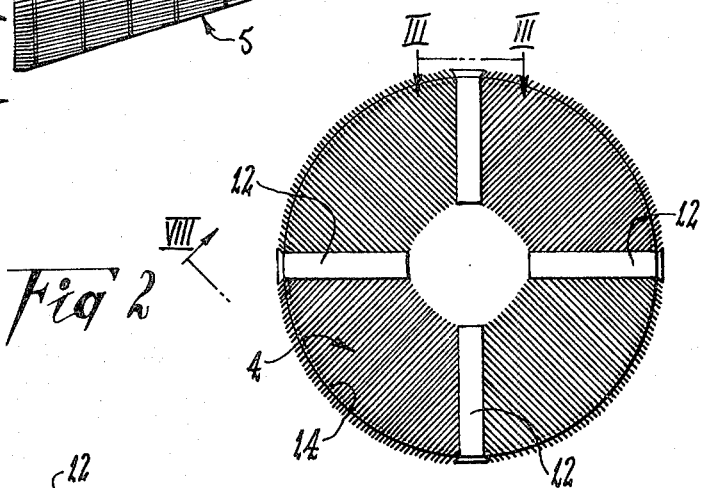
FIG. 2 is an end view looking in the direction of the arrows II—II on the left hand side of FIG. 1.

A strainer of the foregoing kind may include a frame composed of an outlet end piece 11 aad a plurality of longitudinal ribs 12 connected to that end piece 11 and diverging away therefrom towards the inlet end 2. In the construction shown, the inlet end 2 is circular and has an outer diameter not substantially smaller than the inner diameter of the conduit 8 into which the strainer is to fit. The outlet end piece 11 is a plate of any suitable external configuration and having an opening 13 therethrough which is substantially smaller than the opening 14 defined at the inlet end 3. In the example construction shown, four longitudinal ribs 12 are arranged around the strainer body 1 at regularly spaced intervals. The ribs 12 converge towards one another and also towards the longitudinal axis of the strainer body 1, in a direction towards the outlet end piece 11. Each rib 12 may be in the form of a flat plate arranged partway in the depth of the slats 9 so that a channel is in effect formed at the inside surface of each rib 12 and the open top 15 of the channel faces inwardly towards the longitudinal axis of the strainer body as shown in FIG. 2.

The slats 9 which form the side wall 5 of the strainer body 1 are preferably of rectangular cross-section and are arranged edge-on - i.e., they have their broad flat surfaces 16 in spaced face to face relationship (FIG. 4). Glass fibre reinforced plastics or any other suitable material may be used for the slats 9. In the construction shown, the slats 9 are divided into four groups 20, each of which fits within or over the space between two adjacent frame ribs 12 and any appropriate means may be employed to retain the slats 9 of each group 20 in assembly with one another and with the frame of the strainer body 1.

Figure 3:
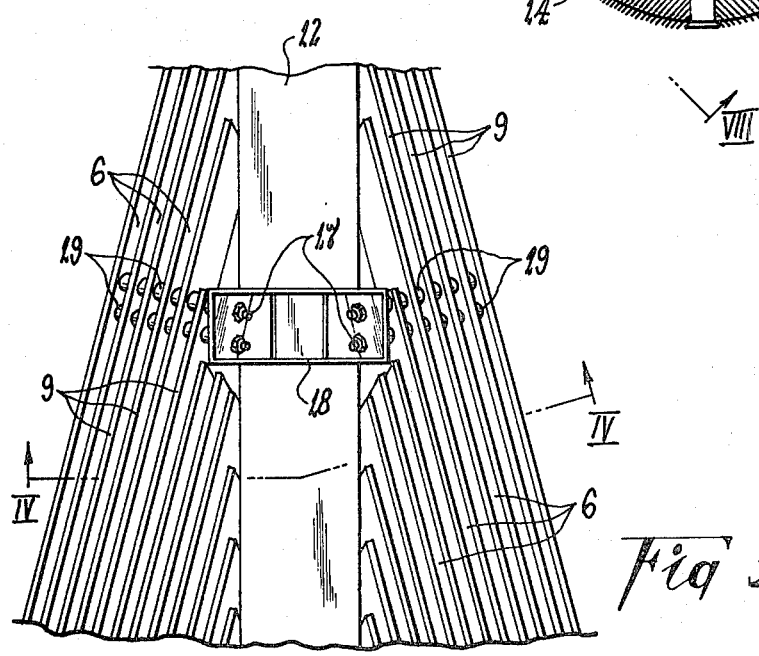
FIG. 3 is an enlarged view of a portion of the outer surface of the strainer looking in the direction of arrows III—III of FIG. 2.

According to the arrangement shown, the slats 9 of each group 20 are held together by a series of retainer rods 17 which extend transverse of the slats 9 and are spaced apart in the longitudinal direction of the strainer body 1. Each rod 17 passes through a hole in each slat 9 of the group and projects beyond each side of the group 20 for connection to the ribs 12 of the strainer frame. For example, as shown, each end of each rod 17 may be secured to a respective bracket 18 secured to the adjacent frame rib 12 (FIG. 3). The spacing of the slats 9 may be controlled by spacer sleeves 19 (FIGS. 3 to 5) located on at least some of the rods 17 so as to be interposed between each two adjacent slats 9.

In view of the converging nature of the strainer, each slat group 20 will have a wedge-shaped configuration as best seen in FIG. 8. Since the slat spacing 6 is substantially consistent, it naturally follows that the number of slats 9 will reduce progressively from the inlet end 2 towards the outlet end 3. That is, a number of the slats 9 which are at the center of the group 20 extend the full length of the strainer body 1 and on each side of that number the slats 9 become progressively shorter as they are located further from the center of the group 20. A further consequence of the slat arrangement is that the cross-sectional shape of the strainer body 1 varies from one end to the other. At the inlet end 2, the slats 9 are arranged in a circle, but at the outlet end 3 they are arranged more in the shape of a square, or at least a four sided figure having curved sides (FIG. 2).

Figure 9:
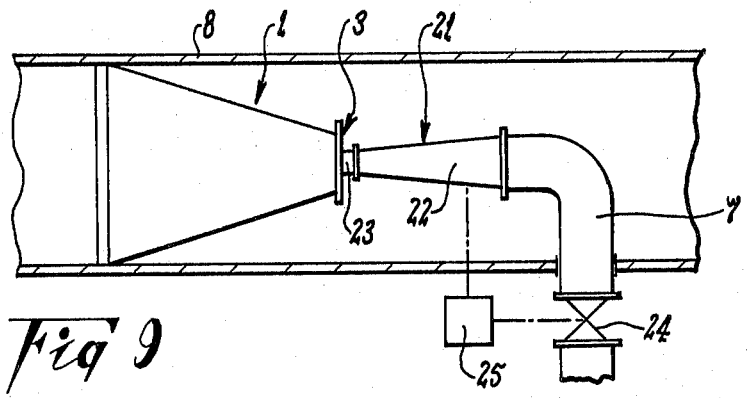
FIG. 9 is a view similar to FIG. 6 but showing an alternative form of installation.

When a strainer body 1 as described is located in a conduit 8, the inlet end 2 is located upstream of the flow path and preferably fits neatly within the conduit 8 so that the entire liquid stream is directed through the strainer body 1 (see FIG. 6). The outlet end 3 may be connected directly (FIG. 6) or indirectly (FIG. 9) to the discharge pipe 7. An example of the latter case is shown in FIG. 9 in which a secondary strainer 21 is located between the outlet end 3 and the discharge pipe 7. Such a secondary strainer 21 may be of tubular form having a gradual increase in cross section in a direction away from the outlet end 3 of the primary strainer as shown in FIG. 9. The secondary strainer 21 may be formed in any appropriate fashion, such as having a side wall 22 composed of perforated plate or of a plurality of spaced and longitudinally extending slats or bars.

A flow restrictor 23 may be provided at the interface between the primary and secondary strainers 1 and 21 and a shut-off valve 24 may be located on the outlet side of the secondary strainer 21 as shown in FIG. 9. The valve 24 may be controlled manually or automatically through sensing means 25 which is responsive to a build up of particles within the secondary strainer 21, or to differential pressure across the flow restrictor 23.

In use, liquid entering the body 1 of the primary strainer is not diverted substantially from its flow path (as depicted by arrows 26 in FIG. 6) so there is little or no loss of pressure head. Particles 27 contained in the liquid impinge against the inner edges of the longitudinal slats 9, but because of the sloping nature of those slats 9 the trapped particles 27 are urged towards the outlet ends 3 of the strainer as shown in FIGS. 6 and 7. Some of the moving particles 27 will fall into the longitudinal gutters formed by the frame ribs 12 and will be thereby transported to the outlet end 3 of the strainer. There are no transverse surfaces or edges inhibiting transport of the particles 27 since the retaining rods 17 of each group 20 of slats 9 are located outwardly of the slat edges against which the particles 27 engage.

The trapped particles will flow through the outlet opening 13 of the strainer into the discharge pipe 7 or the secondary strainer 21 if one is provided. Thus the strainer is self cleaning and the difficulty experienced with prior strainers is not present. The discharge pipe 7 however, may be controlled by a valve 24 as previously described so that complete exhaust of the trapped particles 27 occurs on a periodic or selective basis.

If a secondary strainer 21 is included, there will be reverse flow created within that strainer 21 when the waste pipe valve 24 is opened. Consequently, that strainer 21 will be also substantially self cleaning.

Figure 10:
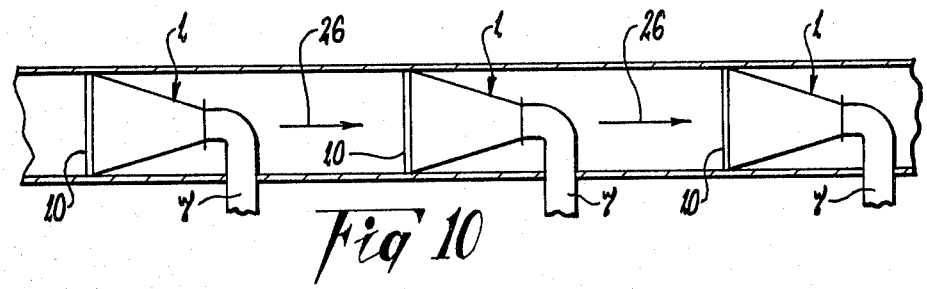
FIG. 10 is a diagrammatic view of a multi-strainer installation.

A plurality of primary strainers 1 as described may be arranged in series within a conduit 8 as shown in FIG. 10 and they may have the same or different slat spacing 6. For example, the slat spacing 6 may progressively reduce from the upstream strainer to the downstream strainer.

It will be appreciated from the foregoing that the present invention provides a relatively simple yet effective strainer which is substantially self cleaning. Although the invention has been described in connection with separation of solids from a liquid body, the strainer is also usable for fractionating solids. That is, the strainer can be arranged to allow passage of fine particles whilst capturing coarser particles. There are of course other uses of the strainer.

Figure 11:
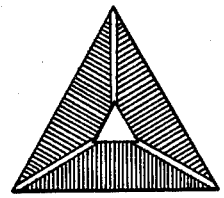
FIGS. 11 to 13 are views similar to FIG. 2 but showing alternative cross sectional configurations.
Figure 12:
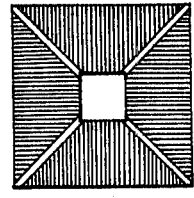
Figure 13:
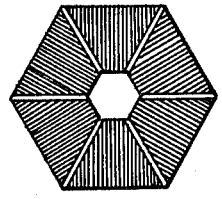
Figure 14:
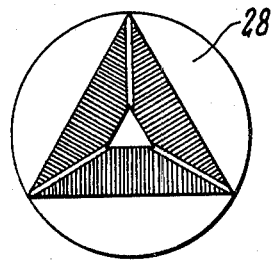
FIG. 14 is a view similar to FIG. 11 but showing an end plate attached.

Furthermore, as previously stated, the cross-sectional shape of the strainer body may be different to that shown in FIGS. 1 to 4. FIGS. 11 to 13 show other possibilities and in each case a circular adaptor plate 28 may be provided at the inlet end to permit the strainer to be fitted within a cylindrical conduit (FIG. 14).

It is to be understood that various alterations, modifications and/or additions may be introduced into the constructions and arrangements of parts previously described without departing from the spirit or ambit of the invention as defined by the appended claims.

Having now described our invention, what we claim as new and desire to secure by Letters Patent is:

1. A self-cleaning fluid strainer including, a hollow body defining an elongate separation chamber, an inlet opening at one end of said chamber for receiving a fluid stream and an outlet opening at the opposite end thereof for discharging solid particles contained within said stream, said inlet opening being substantially larger than said outlet opening, said chamber having a lateral boundary constituted by a surrounding perforate side wall and having an internal surface which is substantially free of transverse discontinuities which would impede movement of solid particles longitudinally along said internal surface, a plurality of groups of bars forming at least a substantial part of said side wall, the said bars of each said group extending substantially parallel to one another in laterally-spaced relationship and generally in the longitudinal direction of said chamber, each said bar being of rectangular cross section and arranged edge-on so that fluid escape passages are formed between opposed flat board surfaces of adjacent said bars and said internal surface is defined by longitudinal edges of said bars, each said fluid escape passage being substantially free of obstruction so that said fluid stream can pass therethrough without substantial change in flow direction, and each said bar slopes inwardly towards the chamber axis in a direction towards said outlet opening at an angle such that solid particles impinging against said internal surface are deflected inwardly and longitudinally towards said outlet opening.

2. A fluid strainer according to claim 1, wherein each two adjacent said groups are separated by an elongate frame member extending between said body ends, and each said frame member forms a gutter exposed to said chamber for transporting solids towards said outlet opening.

3. A fluid strainer according to claim 1, wherein each two adjacent said bars are relatively arranged so that the fluid escape passage defined between progressively increases in transverse width in a direction away from said internal surface.

4. A fluid strainer according to claim 1, wherein said body is substantially circular in transverse cross section at said inlet opening end and is polygonal shape in transverse cross section at said outlet opening end.

5. An installation including a conduit forming part of a fluid distribution system, a strainer according to claim 1 located within said conduit so that said outlet opening end is located downstream of said inlet opening end relative to the direction of fluid flow, and a discharge pipe is connected to said outlet opening and extends out of said conduit.

6. An installation according to claim 5, wherein a secondary strainer is connected to said outlet opening through a flow restrictor, said discharge pipe is connected to the outlet of said secondary strainer, and a valve is provided in said discharge pipe adjacent the secondary strainer outlet.

7. An installation according to claim 6, wherein sensing means is responsive to a build-up of solids and other material in said secondary strainer to cause opening of said valve.

8. An installation according to claim 5, wherein a plurality of said strainers are located in axially spaced relationship within said conduit and the spacing between said bars is different for each said strainer, the larger spacing being in the strainer which is furthermost upstream and the smaller spacing being in the strainer which is furthermost downstream.

9. A self-cleaning fluid strainer which is frustoconically-shaped and has a hollow perforate body with an upstream opening and a downstream opening at opposite ends, the upstream opening being larger than the downstream opening,
the body comprising plural groups of substantially-equally laterally-spaced-apart parallel bars which extends from the upstream end toward the downstream end and provide passages therebetween,
the parallel bars being rectangular and the same in cross-section and disposed so that a larger surface of each bar faces a larger surface of an adjacent bar in the same group of bars,
each bar being secured to an adjacent bar in a manner which provides minimal obstruction to the passage therebetween and does not protrude into the interior portion of the hollow body,
each group of bars extending the full length of the strainer from the upstream end to the downstream end and being secured to two adjacent groups of bars by means which do not protrude into the interior portion of the hollow body.

* * * * *